United States Patent
Madala et al.

(10) Patent No.: US 10,810,017 B2
(45) Date of Patent: Oct. 20, 2020

(54) SYSTEMS AND METHODS FOR HANDLING FIRMWARE DRIVER DEPENDENCIES IN HOST OPERATING SYSTEMS WHILE APPLYING UPDATES FROM BOOTABLE IMAGE FILE

(71) Applicant: Dell Products L.P., Round Rock, TX (US)

(72) Inventors: Raveendra Babu Madala, Bangalore (IN); Soorej Ponnandi, Bangalore (IN); Santosh Gore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 16/237,918

(22) Filed: Jan. 2, 2019

(65) Prior Publication Data

US 2020/0210203 A1    Jul. 2, 2020

(51) Int. Cl.
*G06F 9/4401* (2018.01)
*G06F 8/65* (2018.01)
*G06F 9/445* (2018.01)

(52) U.S. Cl.
CPC .......... *G06F 9/4406* (2013.01); *G06F 8/65* (2013.01); *G06F 9/44505* (2013.01)

(58) Field of Classification Search
CPC ....... G06F 9/4406; G06F 8/65; G06F 9/44505
See application file for complete search history.

(56) References Cited

U.S. PATENT DOCUMENTS

| | | | | |
|---|---|---|---|---|
| 8,112,505 B1 * | 2/2012 | Ben-Shaul | .......... | G06F 16/1767 709/219 |
| 2003/0236970 A1 * | 12/2003 | Palmer | .................... | H04L 67/34 713/1 |
| 2010/0192145 A1 * | 7/2010 | Liles | ........................ | G06F 8/60 717/174 |
| 2014/0380340 A1 * | 12/2014 | Knichel | ................. | G06F 8/654 719/327 |
| 2015/0178096 A1 * | 6/2015 | Inbaraj | ...................... | G06F 8/65 713/2 |
| 2019/0042229 A1 * | 2/2019 | Kotary | .................... | G06F 8/654 |

* cited by examiner

*Primary Examiner* — Jaweed A Abbaszadeh
*Assistant Examiner* — Gayathri Sampath
(74) *Attorney, Agent, or Firm* — Jackson Walker L.L.P.

(57) ABSTRACT

A bootable update image file may be configured to, if operating system driver updates associated with a firmware update are boot-critical: modify a boot order of the information handling system to cause the information handling system to boot to an operating system of the information handling system such that the operating system fetches driver update packages from an update partition of the information handling system, applies the driver update packages, and modifies the boot order to cause the information handling system to boot to the bootable image file in a subsequent boot and in the subsequent boot, apply the firmware update; and, if driver updates are non-boot-critical: apply the firmware update and modify the boot order to cause the information handling system to boot to the operating system such that the operating system fetches the driver update packages from an update partition and applies the driver update packages.

18 Claims, 4 Drawing Sheets

SYSTEMS AND METHODS FOR HANDLING FIRMWARE DRIVER DEPENDENCIES IN HOST OPERATING SYSTEMS WHILE APPLYING UPDATES FROM BOOTABLE IMAGE FILE

TECHNICAL FIELD

The present disclosure relates in general to information handling systems, and more particularly to methods and systems for handling firmware driver dependencies in host operating systems while applying updates from a bootable image file.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To enable a single and simplified process for performing basic input/output system (BIOS) and firmware updates on an information handling system, a bootable update image file with operating system specific update content may be published. However, a number of problems may exist if any of the BIOS or firmware to be updated has dependencies on a host information handling system. For example, a user (e.g., administrator or end user) of the information handling system may not be informed of the need for updating operating system drivers to be compatible with updated firmware. In addition, an information handling system may not boot if a firmware-dependent operating system driver is a boot critical driver. Using traditional approaches, no automatic mechanisms exist for updating a host operating system driver for resolving dependency from a bootable update image file or for obtaining host operating system driver/application version information while applying updates from the bootable update image file.

SUMMARY

In accordance with the teachings of the present disclosure, the disadvantages and problems associated with handling firmware driver dependencies while applying updates from a bootable image file may be reduced or eliminated.

In accordance with embodiments of the present disclosure, an information handling system may include a host system processor, a computer-readable storage medium communicatively coupled to the host system processor and having stored thereon a bootable update image file for performing a firmware update associated with the information handling system and configured to, when read and executed by the processor: determine if operating system driver updates associated with the firmware update are boot-critical, and if any operating system driver updates associated with the firmware update are boot-critical: modify a boot order of the information handling system to cause the information handling system to boot to an operating system of the information handling system such that the operating system fetches driver update packages from an update partition of the information handling system, applies the driver update packages, and modifies the boot order to cause the information handling system to boot to the bootable image file in a subsequent boot and in the subsequent boot, apply the firmware update. If all operating system driver updates associated with the firmware update are non-boot-critical, the bootable image update file may apply the firmware update and after applying the firmware update, modify the boot order to cause the information handling system to boot to the operating system such that the operating system fetches the driver update packages from an update partition of the information handling system and applies the driver update packages.

In accordance with these and other embodiments of the present disclosure, a method may include, in an information handling system comprising a host system processor and a computer-readable storage medium communicatively coupled to the host system processor and having stored thereon a bootable update image file for performing a firmware update associated with the information handling system, determining if operating system driver updates associated with the firmware update are boot-critical and if any operating system driver updates associated with the firmware update are boot-critical: modifying a boot order of the information handling system to cause the information handling system to boot to an operating system of the information handling system such that the operating system fetches driver update packages from an update partition of the information handling system, applies the driver update packages, and modifies the boot order to cause the information handling system to boot to the bootable image file in a subsequent boot and in the subsequent boot, applying the firmware update. The method may also include, if all operating system driver updates associated with the firmware update are non-boot-critical: applying the firmware update and after applying the firmware update, modifying the boot order to cause the information handling system to boot to the operating system such that the operating system fetches the driver update packages from an update partition of the information handling system and applies the driver update packages.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a host system processor and a computer-readable storage medium communicatively coupled to the host system processor and having stored thereon a bootable update image file for performing a firmware update associated with the information handling system, determine if operating system driver updates associated with the firmware update are boot-critical, and if any operating system driver updates associated with the firmware update are boot-critical: modify a boot order of the information handling system to cause the information handling system to boot to an operating system of the information handling system such that the operating system fetches driver update packages from an update partition of the information handling system, applies the driver update packages, and modifies the boot order to cause the information handling system to boot to the bootable image file in a subsequent boot and in the subsequent boot, apply the firmware update. The instructions may further be configured to, if all operating system driver updates associated with the firmware update are non-boot-critical: apply the firmware update; and after applying the firmware update, modify the boot order to cause the information handling system to boot to the operating system such that the operating system fetches the driver update packages from an update partition of the information handling system and applies the driver update packages.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
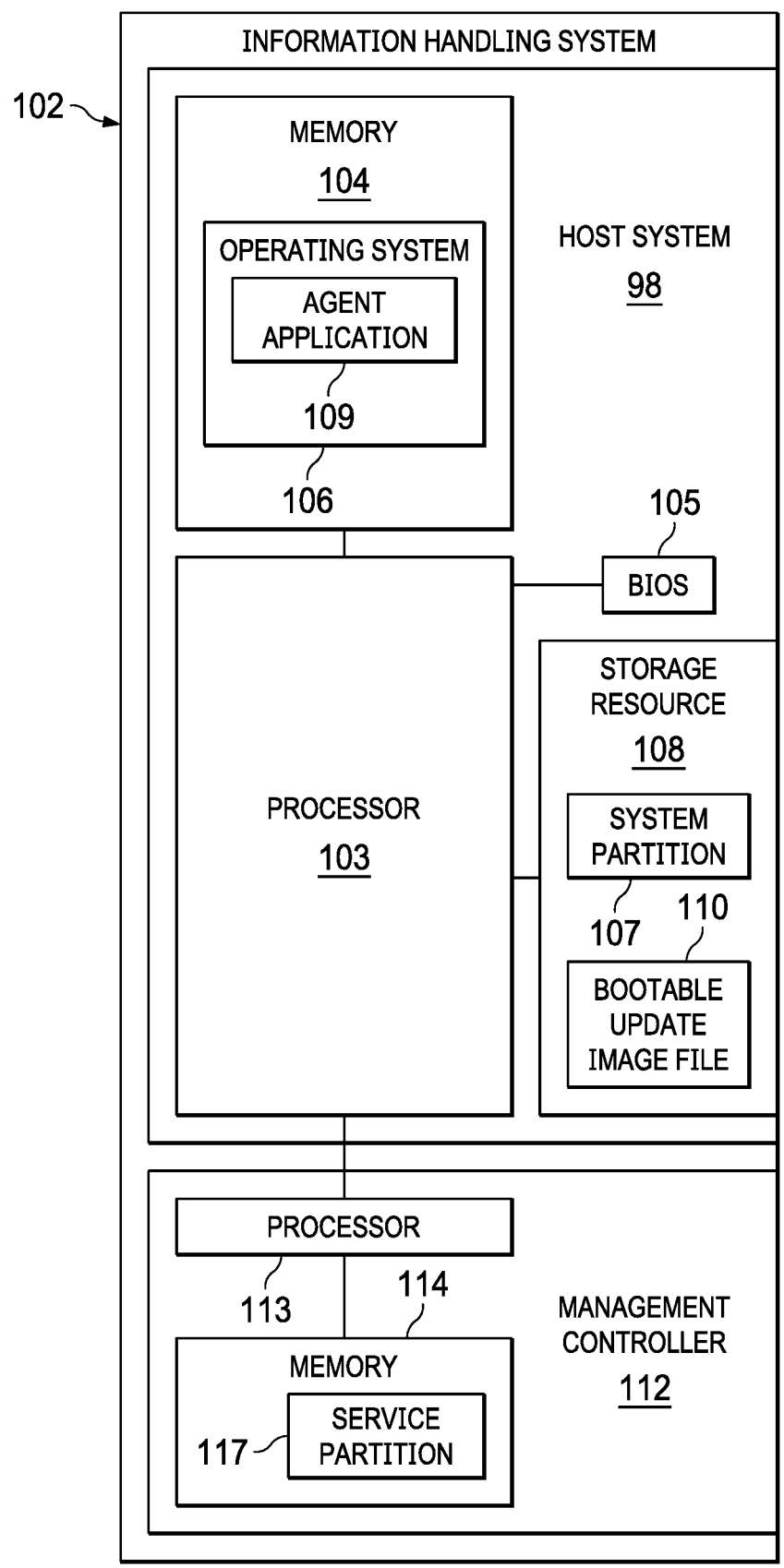
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a storage resource 108 communicatively coupled to processor 103, and a management controller 112 communicatively coupled to processor 103. In operation, processor 103, memory 104, BIOS 105, and storage resource 108 may comprise at least a portion of a host system 98 of information handling system 102. For purposes of clarity and exposition, information handling system 102 has been depicted to comprise only a single host system 98. In some embodiments, information handling system 102 may comprise a plurality of host systems 98.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. Active portions of operating system 106 may be transferred to memory 104 for execution by processor 103. Although operating system 106 is shown in FIG. 1 as stored in memory 104, in some embodiments operating system 106 may be stored in storage media accessible to processor 103 (e.g., storage resource 108 and/or other storage media), and active portions of operating system 106 may be transferred from such storage media to memory 104 for execution by processor 103.

As shown in FIG. 1, operating system 106 may include an agent application 109. Agent application 109 may comprise one or more programs of instructions which may be read and executed by processor 103 and may be configured to, when executed by processor 103, to provide an inventory of drivers present in an update partition (e.g., system partition 107 or service partition 117) and/or configured to fetch drivers from an update partition and update drivers upon boot of information handling system 102, as described in greater detail below. In some embodiments, agent application 109 may comprise an Integrated Dell Remote Access Controller (iDRAC) Service Module (iSM).

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Storage resource 108 may be communicatively coupled to processor 103 and may include any system, device, or apparatus operable to store information processed by processor 103. Storage resource 108 may include, for example, network attached storage, one or more direct access storage devices (e.g., hard disk drives), one or more optical media drives (e.g., CD-ROM, DVD drives, Blu-Ray disk drive, etc.), and/or one or more sequential access storage devices (e.g., tape drives). As shown in FIG. 1, storage resource 108 may have stored thereon a system partition 107 and a bootable update image file 110 (in some embodiments, system partition 107 and bootable update image file 110 may be stored on different storage resources 108).

System partition 107 may comprise a partition of storage resource 108 that may be used by BIOS 105, particularly in embodiments in which BIOS 105 comprises a UEFI, wherein BIOS 105 may load files stored on system partition 107 to initialize installed operating systems (e.g., operating system 106) and/or various system utilities. In a UEFI-enabled BIOS 105, system partition 107 may comprise an Extensible Firmware Interface (EFI) System Partition (ESP). In embodiments of information handling system 102 in which BIOS 105 is not UEFI-enabled, system partition 107 may not be present within information handling system 102.

Bootable update image file 110 may comprise a disk image which is bootable and which includes updates for BIOS 105 and firmware of information handling system 102. In some embodiments, bootable update image file 110 may comprise a disk image of an optical disc comprising an archive file that includes all information that would be written to an optical disc, sector by sector, including the optical disc file system (e.g., an ISO image file).

Management controller 112 may be configured to provide management facilities for management of information handling system 102. Such management may be made by management controller 112 even if information handling system 102 is powered off or powered to a standby state. Management controller 112 may include a processor 113 and a memory 114. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be communicatively coupled to processor 103. Such coupling may be via a Universal Serial Bus (USB), System Management Bus (SMBus), Peripheral Component Interconnect Express (PCIe) bus, and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, memory 114 may have stored thereon a service partition 117. Service partition 117 may comprise a partition of memory 114 that may be used by processor 103 to store instructions or data for carrying out the functionality of management controller 112. In some embodiments, service partition 117 may comprise a Managed System Service Repository (MASER).

In addition to processor 103, memory 104, storage resource 108, and management controller 112, information handling system 102 may include one or more other information handling resources.

In operation, and as described in greater detail below, system partition 107 (for UEFI-enabled BIOS 105) or service partition 117 (for non-UEFI-enabled BIOS 105) may be utilized to store required driver update files while updating firmware for BIOS 105 and/or other components of information handling system 102 from bootable update image file 110. Where boot-critical drivers are found in firmware dependencies, prior to bootable update image file 110 updating firmware, bootable update image file 110 may store all driver update packages in system partition 107 or service partition 117, as applicable, and then modify the boot order for information handling system 102 to boot to operating system 106. After reboot, agent application 109 of operating system 106 may fetch the driver update packages from system partition 107 or service partition 117, as applicable, and apply the firmware updates. After applying updates, operating system 106 may modify the boot order to boot from bootable update image file 110. After another reboot, bootable update image file 110 shall apply firmware updates from bootable update image file 110.

Where no boot-critical drivers are found in firmware dependencies, bootable update image file 110 may apply all firmware updates and then copy driver update packages to system partition 107 or service partition 117, as applicable, provide an indication to a user (e.g., administrator or end user) of information handling system 102 regarding the pending driver updates embodied in the driver update packages, and may modify the boot order for information handling system 102 to boot to operating system 106. After reboot, agent application 109 of operating system 106 may fetch the driver update packages from system partition 107 or service partition 117, as applicable, apply the firmware updates, and provide an indication to the user of the driver update status.

Figure 2:
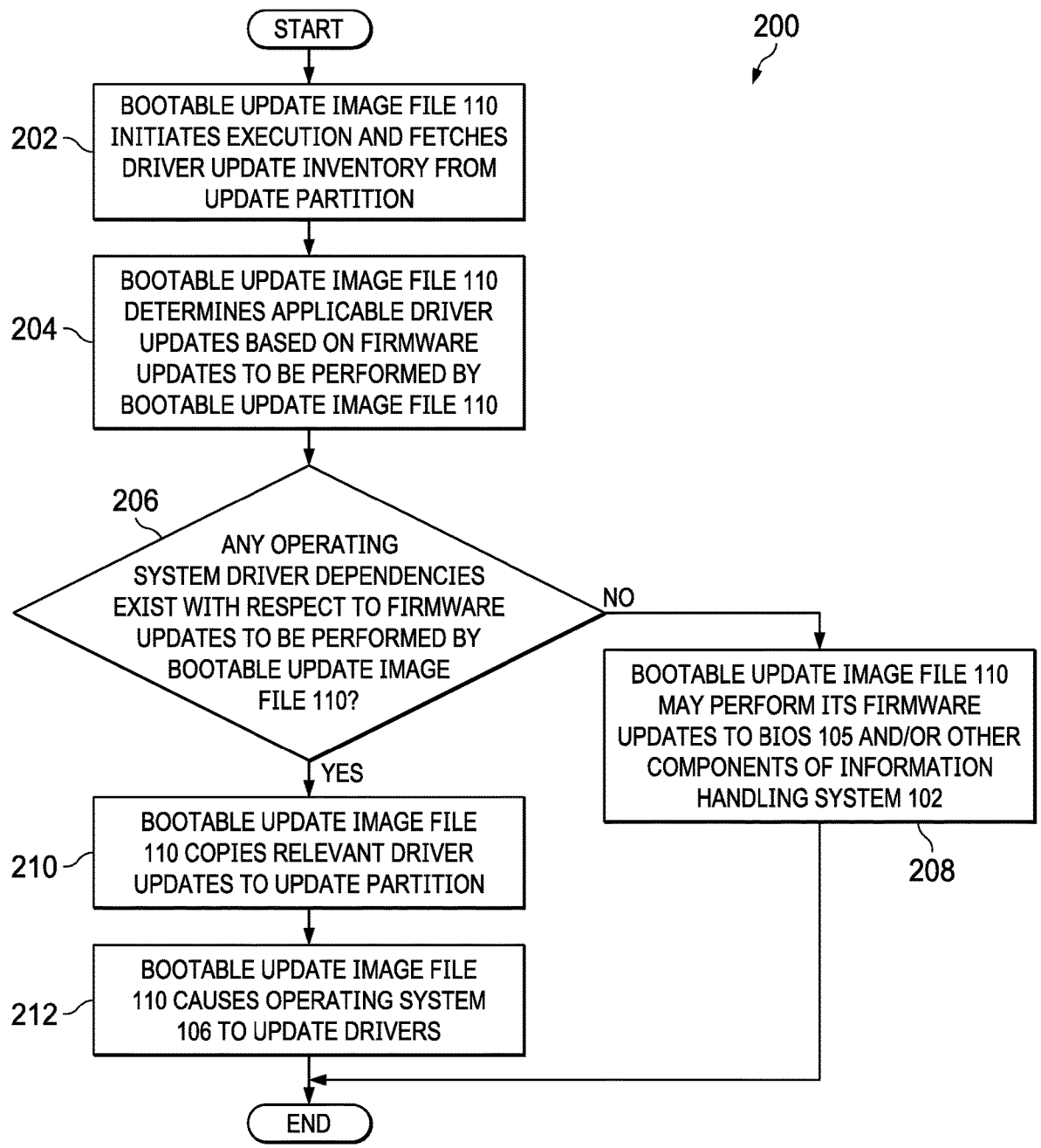
FIG. 2 illustrates a flow chart of an example method for determining drivers to be updated by an operating system, in accordance with embodiments of the present disclosure.

FIG. 2 illustrates a flow chart of an example method 200 for determining drivers to be updated by operating system 106, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, bootable update image file 110 may initiate execution and fetch a driver update inventory from an update partition. If operating system 106 is a UEFI-based operating system, the update partition may comprise system partition 107. If operating system 106 is a not a UEFI—based operating system, the update partition may comprise system partition 107. Prior to execution of method 200, the update partition may be populated by agent application 109. For example, during its own execution prior to execution of method 200, agent application 109 may collect a driver inventory from operating system 106, and copy such inventory to the update partition.

At step 204, bootable update image file 110 may determine any applicable driver updates based on the firmware updates to be performed by bootable update image file 110.

At step 206, bootable update image file 110 may determine if any operating system driver dependencies exist with respect to the firmware updates to be performed by bootable update image file 110. If no operating system driver dependencies exist with respect to the firmware updates to be performed by bootable update image file 110, method 200 may proceed to step 208. Otherwise, method 200 may proceed to step 210.

At step 208, in the absence of driver dependencies with respect to the firmware updates to be performed by bootable update image file 110, bootable update image file 110 may perform its firmware updates to BIOS 105 and/or other components of information handling system 102. After completion of step 208, method 200 may end.

At step 210, in response to the existence of driver dependencies with respect to the firmware updates to be performed by bootable update image file 110, bootable update image file 110 may copy the relevant driver updates to the update partition. At step 212, bootable update image file 110 may cause agent application 109 of operating system 106 to update drivers as described in greater detail below in reference to FIGS. 3 and 4.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented in whole or part using bootable update image file 110, operating system 106, and/or any other system operable to implement method 200. In certain embodiments, method 200 may be implemented partially or fully in software and/or firmware embodied in computer-readable media.

Figure 3:
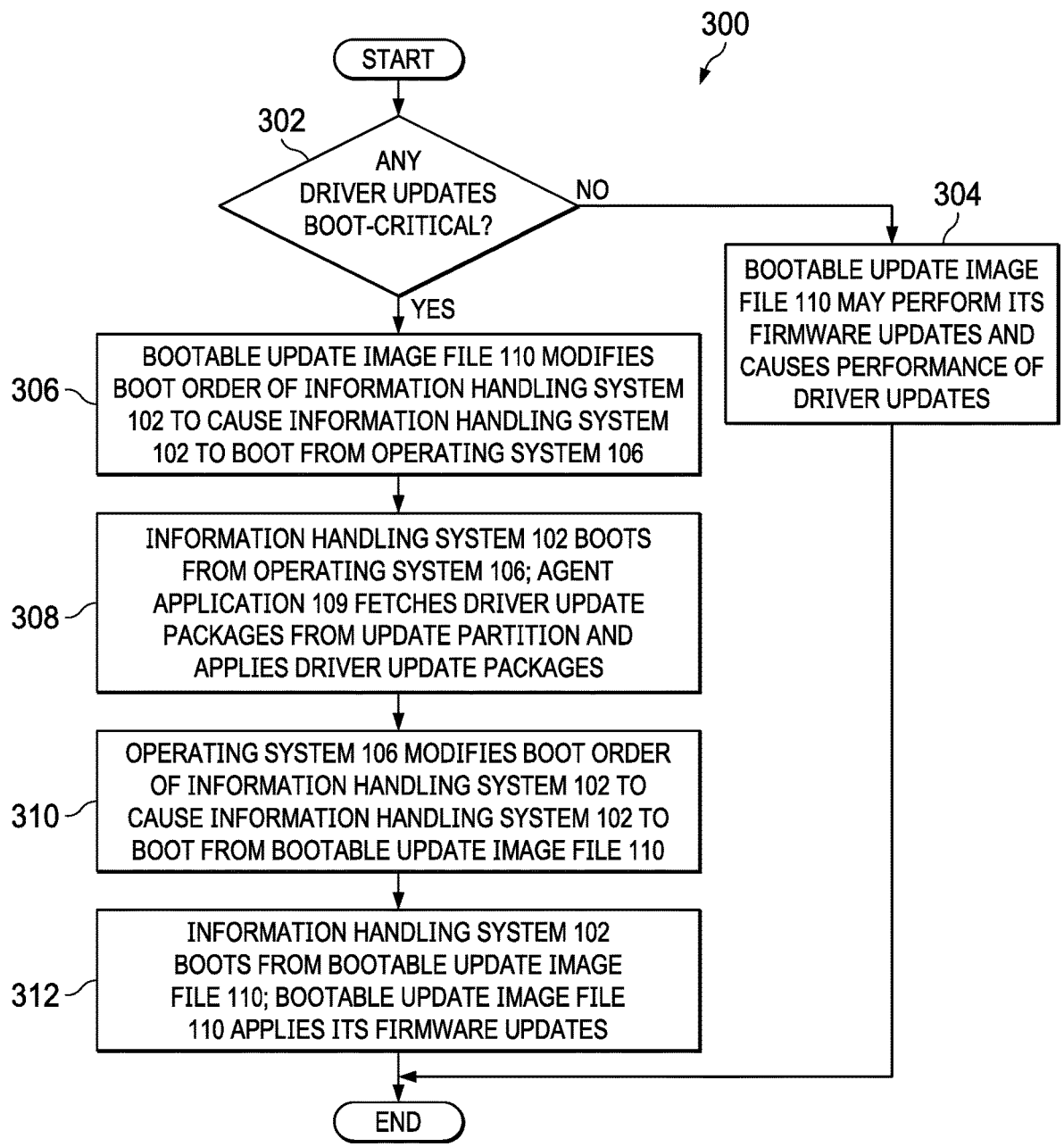
FIG. 3 illustrates a flow chart of an example method for handling dependent driver updates in the presence of boot-critical drivers, in accordance with embodiments of the present disclosure.

FIG. 3 illustrates a flow chart of an example method 300 for handling dependent driver updates in the presence of boot-critical drivers, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, bootable update image file 110 may determine if any of the driver updates to be performed by operating system 106 and/or agent application 109 in connection with the firmware updates of bootable update image file 110 are boot-critical. If any of the driver updates to be performed by operating system 106 and/or agent application 109 in connection with the firmware updates of bootable update image file 110 are boot-critical, method 300 may proceed to step 306. Otherwise, method 300 may proceed to step 304.

At step 304, responsive to none of the driver updates to be performed by operating system 106 and/or agent application 109 in connection with the firmware updates of bootable update image file 110 being boot-critical, bootable update image file 110 may apply the firmware and driver updates as described in greater detail below with respect to method 400. After completion of step 304, method 300 may end.

At step 306, responsive to some of the driver updates to be performed by operating system 106 and/or agent application 109 in connection with the firmware updates of bootable update image file 110 being boot-critical, bootable update image file 110 may modify a boot order of information handling system 102 to cause information handling system 102 to boot from operating system 106.

At step 308, information handling system 102 may boot from operating system 106, and agent application 109 of operating system 106 may fetch driver update packages from the update partition and apply such driver update packages to update drivers. At step 310, operating system 106 may modify a boot order of information handling system 102 to cause information handling system 102 to boot from bootable update image file 110.

At step 312, information handling system 102 may boot from bootable update image file 110, and bootable update image file 110 may apply its firmware updates to BIOS 105 and/or other components of information handling system 102. After completion of step 312, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented in whole or part using bootable update image file 110, operating system 106, and/or any other system operable to implement method 300. In certain embodiments, method 300 may be implemented partially or fully in software and/or firmware embodied in computer-readable media.

Figure 4:
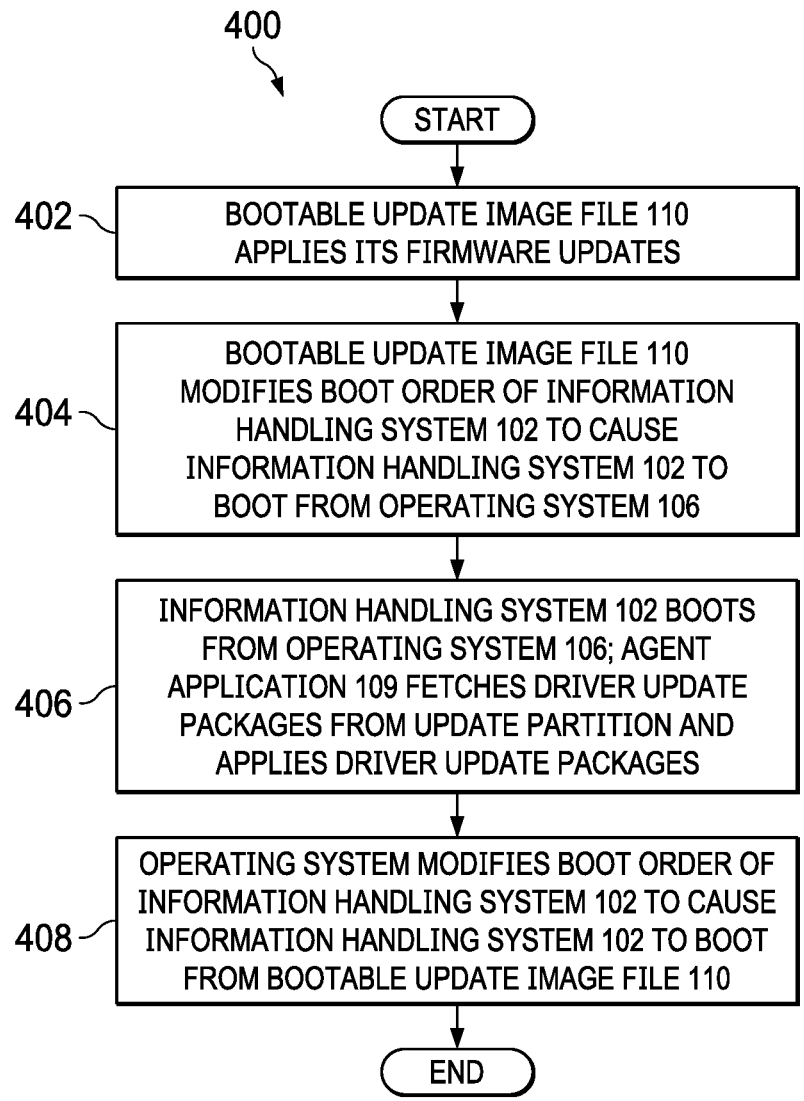
FIG. 4 illustrates a flow chart of an example method for handling dependent driver updates in the presence of boot-critical drivers, in accordance with embodiments of the present disclosure.

FIG. 4 illustrates a flow chart of an example method 400 for handling dependent driver updates in the absence of boot-critical drivers, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, bootable update image file 110 may, responsive to none of the driver updates to be performed by operating system 106 and/or agent application 109 in connection with the firmware updates of bootable update image file 110 being boot-critical, apply its firmware updates. At step 404, bootable update image file 110 may modify a boot order of information handling system 102 to cause information handling system 102 to boot from operating system 106.

At step 406, information handling system 102 may boot from operating system 106, and agent application 109 of operating system 106 may fetch driver update packages from the update partition and apply such driver update packages to update drivers. At step 408, operating system 106 may modify a boot order of information handling system 102 to cause information handling system 102 to boot from bootable update image file 110. After completion of step 408, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented in whole or part using bootable update image file 110, operating system 106, and/or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host system processor;
   a computer-readable storage medium communicatively coupled to the host system processor and having stored thereon a bootable update image file for performing a firmware update associated with the information handling system and configured to, when read and executed by the processor:
   determine if operating system driver updates associated with the firmware update are boot-critical;
   if any operating system driver updates associated with the firmware update are boot-critical:
      modify a boot order of the information handling system to cause the information handling system to boot to an operating system of the information handling system such that the operating system fetches driver update packages from an update partition of the information handling system, applies the driver update packages, and modifies the boot order to cause the information handling system to boot to the bootable image file in a subsequent boot; and
      in the subsequent boot, apply the firmware update; and
   if all operating system driver updates associated with the firmware update are non-boot-critical:
      apply the firmware update; and
      after applying the firmware update, modify the boot order to cause the information handling system to boot to the operating system such that the operating system fetches the driver update packages from an update partition of the information handling system and applies the driver update packages.

2. The information handling system of claim 1, wherein the bootable update image file is further configured to store the driver update packages to the update partition.

3. The information handling system of claim 1, wherein the update partition is a system partition of a storage resource of the information handling system.

4. The information handling system of claim 1, wherein the update partition is an Extensible Firmware Interface System Partition.

5. The information handling system of claim 1, wherein the update partition is a service partition of a management controller communicatively coupled to the processor.

6. The information handling system of claim 1, wherein the bootable update image file is an ISO file representing an optical disk image.

7. A method comprising, in an information handling system comprising a host system processor and a computer-readable storage medium communicatively coupled to the host system processor and having stored thereon a bootable update image file for performing a firmware update associated with the information handling system:
   determining if operating system driver updates associated with the firmware update are boot-critical;
   if any operating system driver updates associated with the firmware update are boot-critical:
      modifying a boot order of the information handling system to cause the information handling system to boot to an operating system of the information handling system such that the operating system fetches driver update packages from an update partition of the information handling system, applies the driver update packages, and modifies the boot order to cause the information handling system to boot to the bootable image file in a subsequent boot; and
      in the subsequent boot, applying the firmware update; and
   if all operating system driver updates associated with the firmware update are non-boot-critical:
      applying the firmware update; and
      after applying the firmware update, modifying the boot order to cause the information handling system to boot to the operating system such that the operating system fetches the driver update packages from an update partition of the information handling system and applies the driver update packages.

8. The method of claim 7, wherein the bootable update image file is further configured to store the driver update packages to the update partition.

9. The method of claim 7, wherein the update partition is a system partition of a storage resource of the information handling system.

10. The method of claim 7, wherein the update partition is an Extensible Firmware Interface System Partition.

11. The method of claim 7, wherein the update partition is a service partition of a management controller communicatively coupled to the processor.

12. The method of claim 7, wherein the bootable update image file is an ISO file representing an optical disk image.

13. An article of manufacture comprising:
    a non-transitory computer-readable medium; and
    computer-executable instructions carried on the computer-readable medium, the instructions readable by a processor, the instructions, when read and executed, for causing the processor to, in an information handling system comprising a host system processor and a computer-readable storage medium communicatively coupled to the host system processor and having stored thereon a bootable update image file for performing a firmware update associated with the information handling system:
    determine if operating system driver updates associated with the firmware update are boot-critical;
    if any operating system driver updates associated with the firmware update are boot-critical:
       modify a boot order of the information handling system to cause the information handling system to boot to an operating system of the information handling system such that the operating system fetches driver update packages from an update partition of the information handling system, applies the driver update packages, and modifies the boot order to cause the information handling system to boot to the bootable image file in a subsequent boot; and
       in the subsequent boot, apply the firmware update; and
    if all operating system driver updates associated with the firmware update are non-boot-critical:
       apply the firmware update; and
       after applying the firmware update, modify the boot order to cause the information handling system to boot to the operating system such that the operating system fetches the driver update packages from an update partition of the information handling system and applies the driver update packages.

14. The article of claim 13, wherein the bootable update image file is further configured to store the driver update packages to the update partition.

15. The article of claim 13, wherein the update partition is a system partition of a storage resource of the information handling system.

16. The article of claim 13, wherein the update partition is an Extensible Firmware Interface System Partition.

17. The article of claim 13, wherein the update partition is a service partition of a management controller communicatively coupled to the processor.

18. The article of claim 13, wherein the bootable update image file is an ISO file representing an optical disk image.

* * * * *